(12) United States Patent
Aschenbeck et al.

(10) Patent No.: US 7,541,059 B2
(45) Date of Patent: Jun. 2, 2009

(54) ROOFING MATERIALS HAVING ENGINEERED COATINGS

(75) Inventors: David P. Aschenbeck, Newark, OH (US); Carla A. Miller, Newark, OH (US); David B. Ollett, Pickerington, OH (US)

(73) Assignee: Owens Corning Intellectual Capital, LLCDE (US)

( * ) Notice: Subject to any disclaimer, the term of this patent is extended or adjusted under 35 U.S.C. 154(b) by 0 days.

(21) Appl. No.: 11/773,380

(22) Filed: Jul. 3, 2007

(65) Prior Publication Data

US 2008/0044626 A1 Feb. 21, 2008

Related U.S. Application Data

(62) Division of application No. 09/975,006, filed on Oct. 10, 2001, now Pat. No. 7,238,408.

(51) Int. Cl.
*B05D 1/36* (2006.01)
(52) U.S. Cl. .......................... 427/188; 427/186
(58) Field of Classification Search .............. 427/186, 427/188

See application file for complete search history.

(56) References Cited

U.S. PATENT DOCUMENTS

| 15,352 | A | 7/1856 | Snyder |
| 1,448,155 | A | 3/1923 | Schutte |
| 1,689,985 | A | 10/1928 | Wardell |
| 1,796,861 | A | 3/1931 | Crabbs |

(Continued)

FOREIGN PATENT DOCUMENTS

DE 94 05 349 7/1994

(Continued)

OTHER PUBLICATIONS

Kirk-Othmer Encyclo. of Chem. Tchnology, 4th Ed., vol. 6, pp. 609-621, 1993.*

*Primary Examiner*—Frederick J Parker
(74) *Attorney, Agent, or Firm*—James J. Dottavio; Joan N. Drew

(57) ABSTRACT

An asphalt-based roofing material includes a coating having a top portion containing a mixture of asphalt and igneous and/or metamorphic rock particles, while the mat portion of the coating contains a mixture of asphalt and a filler which contains less than 10% igneous and/or metamorphic rock particles. In other embodiments, the top portion but not the bottom portion of the coating meets or exceeds a pliability standard, passes a weathering performance test, or has a high solar reflectance. In another embodiment relating to a laminated roofing material, the top portion but not the bottom portion has viscoelastic properties effective to prevent the coating from sticking to an adjacent shingle in a bundle. The invention also relates to a continuous process of applying first and second coatings to a mat for manufacturing a roofing material. In a first coating operation, a first asphalt-based coating is continuously applied to a first surface of the mat so that the first coating saturates the mat and forms a layer on the first surface. In a second coating operation, a second asphalt-based coating is continuously applied to a second surface of the mat so that the second coating forms a layer on the second surface. The second coating has different properties from the first coating.

38 Claims, 5 Drawing Sheets

U.S. PATENT DOCUMENTS

| | | | |
|---|---|---|---|
| 1,802,032 A * | 4/1931 | Overbury | 427/187 |
| 1,873,886 A | 8/1932 | Heppes | |
| 2,085,992 A | 7/1937 | Nelson | |
| 2,153,887 A | 4/1939 | Greider et al. | |
| 2,163,678 A | 6/1939 | Gundlach | |
| 2,356,570 A | 8/1944 | Deuchler | |
| 3,369,956 A | 2/1968 | Schuetz et al. | |
| 3,484,267 A | 12/1969 | Sadler, III | |
| 4,079,158 A | 3/1978 | Kennepohl et al. | |
| 4,107,375 A | 8/1978 | Iwasaki et al. | |
| 4,405,680 A | 9/1983 | Hansen | |
| 4,599,258 A | 7/1986 | Hageman | |
| 4,609,696 A | 9/1986 | Wilkes | |
| 4,659,389 A | 4/1987 | Wombles et al. | |
| 4,690,839 A | 9/1987 | Iwasaki et al. | |
| 4,848,057 A | 7/1989 | MacDonald et al. | |
| 4,871,605 A | 10/1989 | Pagen et al. | |
| 4,911,975 A | 3/1990 | Schult | |
| 5,120,777 A | 6/1992 | Chaverot et al. | |
| 5,195,290 A | 3/1993 | Hulett | |
| 5,380,552 A * | 1/1995 | George et al. | 427/186 |
| 5,391,417 A | 2/1995 | Pike | |
| 5,488,807 A | 2/1996 | Terrenzio et al. | |
| 5,494,728 A | 2/1996 | Vermilion et al. | |
| 5,516,573 A | 5/1996 | Geroge et al. | |
| 5,795,389 A * | 8/1998 | Koschitzky | 118/308 |
| 6,037,398 A | 3/2000 | Yap | |
| 6,039,914 A | 3/2000 | Gehrke et al. | |
| 6,120,838 A * | 9/2000 | Zickell | 427/186 |
| 6,199,338 B1 | 3/2001 | Hudson, Jr. et al. | |
| 6,228,785 B1 | 5/2001 | Miller et al. | |
| 6,440,216 B1 * | 8/2002 | Aschenbeck | 118/308 |

FOREIGN PATENT DOCUMENTS

| | | |
|---|---|---|
| WO | WO 97/45607 | 12/1997 |
| WO | WO 00/40794 | 7/2000 |

* cited by examiner ial. The invention also relates to processes for coating
ROOFING MATERIALS HAVING ENGINEERED COATINGS

CROSS REFERENCE TO RELATED APPLICATIONS

This application is a divisional application of U.S. patent application Ser. No. 09/975,006 filed Oct. 10, 2001, now U.S. Pat. No. 7,238,408.

TECHNICAL FIELD AND INDUSTRIAL APPLICABILITY OF THE INVENTION

The present invention relates generally to asphalt-based roofing materials, and more particularly to asphalt-based roofing materials having coatings which are engineered to vary in composition through the thickness of the roofing materials. The invention also relates to processes for coating the roofing materials.

BACKGROUND OF THE INVENTION

Asphalt-based roofing materials, such as roofing shingles, roll roofing and built-up roofing, are installed on the roofs of buildings to provide protection from the elements. Typically, the roofing material is constructed of materials including an inner mat such as a glass fiber mat, an asphalt-based coating which saturates the mat and coats the top and bottom, and a layer of granules embedded in the top coating. The coating usually contains a filler such as ground limestone. Roofing shingles usually have a backdust material such as silica sand on the bottom coating to prevent them from sticking together in a bundle The quantity and composition of the materials used to make a roofing material determine, to a great extent, the performance of the resultant roofing material (e.g., weathering, cracking, blistering, algae resistance, pliability, sticking, and impact resistance). They also determine the cost to produce the roofing material. For a roofing shingle, the cost to produce the shingle is usually about 60-80% materials cost.

Current commercial roofing materials are typically produced with the same asphalt and filler throughout (top coating, mat saturant coating, and bottom coating). Thus, each material in the coating must meet more performance criteria than if different materials could be used in the different portions of the coating. This leads to compromises, typically between cost and performance, but sometimes between one performance parameter and another.

Some patents disclose roofing materials made with varied coating compositions. For example, U.S. Pat. No. 4,405,680 to Hansen discloses a roofing shingle including a mat saturated with a mixture of unblown asphalt and polymer, and coated with a mixture of a blown asphalt and filler.

U.S. Pat. No. 4,848,057 to MacDonald et al. discloses a roofing shingle including a mat saturated with asphalt, coated with a rubber-modified asphalt on portions prone to cracking and a coating asphalt on other portions, and further coated over all portions with the coating asphalt.

U.S. Pat. No. 5,488,807 to Terrenzio et al. discloses a roofing shingle including a mat saturated with asphalt, coated with a first coating asphalt, and further coated with a second coating asphalt on portions of the shingle. The second coating asphalt has greater elongation or extensibility than the first, for example by modifying the asphalt with a polymer and a plasticizer.

U.S. Pat. No. 6,120,838 to Zickell discloses a roofing shingle including a mat saturated and coated with a mixture of flux asphalt and recycled roofing material, and further coated with a polymer-modified asphalt.

In view of the current commercial roofing materials and those disclosed in the patents, there is still a need for roofing materials having coatings that are optimized as a whole for both performance and cost. There is also a need for a process for coating such roofing materials.

SUMMARY OF THE INVENTION

The above objects as well as others not specifically enumerated are achieved by an asphalt-based roofing material according to the invention, and by a process according to the invention for coating the roofing material. In one embodiment, the roofing material comprises a mat saturated and coated with an asphalt-based coating. The coating includes a top portion covering the top of the mat, a mat portion saturating the mat, and a bottom portion covering the bottom of the mat. The top portion of the coating comprises a mixture of asphalt and rock particles which are igneous rock particles, metamorphic rock particles, or a mixture thereof. The mat portion of the coating comprises a mixture of asphalt and filler, the filler containing no more than about 10% igneous and/or metamorphic rock particles.

In another embodiment, the roofing material comprises a mat saturated and coated with an asphalt-based coating. The coating includes a top portion covering the top of the mat, a mat portion saturating the mat, and a bottom portion covering the bottom of the mat. The top portion of the coating meets or exceeds a pliability standard described in CSA Standard A123.5-98. The bottom portion of the coating does not meet the pliability standard.

In another embodiment, the roofing material comprises a mat saturated and coated with an asphalt-based coating. The coating includes a top portion covering the top of the mat, a mat portion saturating the mat, and a bottom portion covering the bottom of the mat. The top portion of the coating includes a top surface layer. At least the top surface layer of the top portion passes a weathering performance test as measured by at least 60 cycles-to-failure using ASTM Method D4799. The bottom portion of the coating does not pass the weathering performance test.

In another embodiment, the roofing material comprises a mat saturated and coated with an asphalt-based coating. The coating includes a top portion covering the top of the mat, a mat portion saturating the mat, and a bottom portion covering the bottom of the mat. The top portion of the coating includes a top surface layer. At least the top surface layer of the top portion has a solar reflectance of at least 0.7 when tested by ASTM Method E903. The bottom portion of the coating has a solar reflectance less than 0.7.

In another embodiment, the roofing material is a laminated asphalt-based roofing material. The laminated roofing material includes an underlay comprising a mat saturated and coated with an asphalt-based coating. The coating includes a top portion covering the top of the mat, a mat portion saturating the mat, and a bottom portion covering the bottom of the mat. The top portion of the coating includes a top surface layer. The laminated roofing material also includes an overlay coveting a portion of the top of the underlay, and leaving a portion of the underlay uncovered. The overlay comprises a layer of an asphalt-based coating, the coating layer including a top surface layer. At is least the top surface layer of the overlay, and at least the top surface layer of the underlay on the uncovered portion of the underlay, are made with an asphalt having viscoelastic properties effective to prevent the coating from sticking to a coating of an adjacent shingle when the shingles are stacked face to face in a bundle and stored at a temperature exceeding 90° F. (32° C.). The bottom portion of the underlay coating is made with an asphalt not having the special viscoelastic properties.

In another embodiment, the roofing material comprises a mat saturated and coated with an asphalt-based coating. The coating includes a top portion covering the top of the mat, a mat portion saturating the mat, and a bottom portion covering the bottom of the mat. The top portion of the coating includes a top surface layer. A layer of granules is embedded in the top surface layer. At least the top surface layer of the top portion has an increased adhesion defined by a granule loss of less than 0.8 grams when the roofing material is soaked in water for seven days and then tested by ASTM Method D4977. The bottom portion of the coating does not have the increased adhesion.

In another embodiment, the roofing material comprises a mat saturated and coated with an asphalt-based coating. The coating includes a top portion covering the top of the mat, a mat portion saturating the mat, and a bottom portion covering the bottom of the mat. The bottom portion of the coating has an increased toughness compared to the top portion of the coating, such that the roofing material has an increased impact resistance of at least one UL 2218 class compared to the same roofing material having a bottom portion of the coating with the same toughness as the top portion.

In another embodiment, the roofing material comprises a mat saturated and coated with an asphalt-based coating. The coating includes a top portion covering the top of the mat, a mat portion saturating the mat, and a bottom portion covering the bottom of the mat. The top portion of the coating includes a top surface layer. A layer of granules is embedded in the top surface layer. At least the top surface layer of the top portion has an increased adhesion defined by a granule loss of less than 0.8 grams when the roofing material is soaked in water for seven days and then tested by ASTM Method D4977. The roofing material further comprises a web fused to the bottom portion of the coating. The roofing material has an increased impact resistance of at least one UL 2218 class compared to the same roofing material without the web.

The process according to the invention for coating the roofing material is a continuous process of applying first and second asphalt-based coatings to a mat. The process comprises continuously moving a continuous mat along a path. The mat has a first surface and a second surface. In a first coating operation, a first asphalt-based coating is continuously applied to the first surface of the mat in a manner so that the first coating saturates the mat and forms a layer on the first surface. Then, in a second coating operation, a second asphalt-based coating is continuously applied to the second surface of the mat in a manner so that the second coating forms a layer on the second surface. The second coating has different properties from the first coating.

In another embodiment, the invention is a continuous process of applying first and second asphalt-based coatings to a mat for manufacturing a roofing material. The process comprising continuously moving a continuous mat along a path, the mat having a first surface and a second surface. In a first coating operation, a first asphalt-based coating is continuously applied to the first surface of the mat in a manner so that the first coating saturates the mat and forms a layer on the first surface. Then, in a second coating operation, a second asphalt-based coating is continuously applied to the second surface of the mat with an applicator roll in a manner so that the second coating forms a layer on the second surface. The second coating operation includes the step of scraping the second coating from the surface of the applicator roll and smoothly applying the scraped coating to the mat. The first and second coatings can either be the same type of coating, or they can have different properties.

The invention also relates to a coating apparatus for applying first and second asphalt-based coatings to a mat for manufacturing a roofing material. The apparatus includes a pair of squeeze rolls for continuously applying a first asphalt-based coating to a first surface of the mat in a manner so that the first coating saturates the mat and forms a layer on the first surface. The apparatus also includes an applicator roll for continuously applying a second asphalt-based coating to a second surface of the mat in a manner so that the second coating forms a layer on the second surface. The apparatus further includes a metering device positioned adjacent the applicator roll with a gap therebetween, the size of the gap determining the thickness of the layer of second coating. The apparatus also includes a scraping device for scraping the second coating from the surface of the applicator roll and smoothly applying the scraped coating to the mat. The first and second coatings can either be the same type of coating, or they can have different properties.

Various objects and advantages of this invention will become apparent to those skilled in the art from the following detailed description of the preferred embodiments, when read in light of the accompanying drawings.

DETAILED DESCRIPTION AND PREFERRED EMBODIMENTS OF THE INVENTION

The asphalt-based roofing materials of the invention can be roofing shingles, roll roofing, built-up roofing, or other similar materials. Typically, the roofing materials are embodied as roofing shingles.

The roofing materials include an inner mat which is saturated and coated with an asphalt-based coating. The mat can be any type known for use in reinforcing asphalt-based roofing materials, such as a mat, web, scrim or felt of fibrous materials such as mineral fibers, cellulose fibers, rag fibers, synthetic fibers such as polymer fibers, or mixtures thereof. Preferably, the mat is a nonwoven mat of glass fibers.

Except as described below, the "asphalt" used in the asphalt-based coating can be any suitable type of bituminous material, such as an asphalt, tar or pitch The asphalt can be either a naturally occurring asphalt or a manufactured asphalt, such as an asphalt produced by refining petroleum. The coating may also include other materials, such as fillers, polymers, waxes, stabilizers, pigments, antioxidants, and/or solvents. However, as described below, in certain embodiments of the invention the type of asphalt in the coating, the other materials in the coating, and/or the processing of the coating are specifically engineered for different portions of the coating.

The roofing materials of the invention have coatings which vary in composition through the thickness of the roofing materials. The concept is to "tune" the performance of the coating by adjusting its composition through the thickness. This can yield either better performance or less cost with the same performance. The invention provides roofing materials that are optimized as a whole fox both performance and cost.

Figure 1:
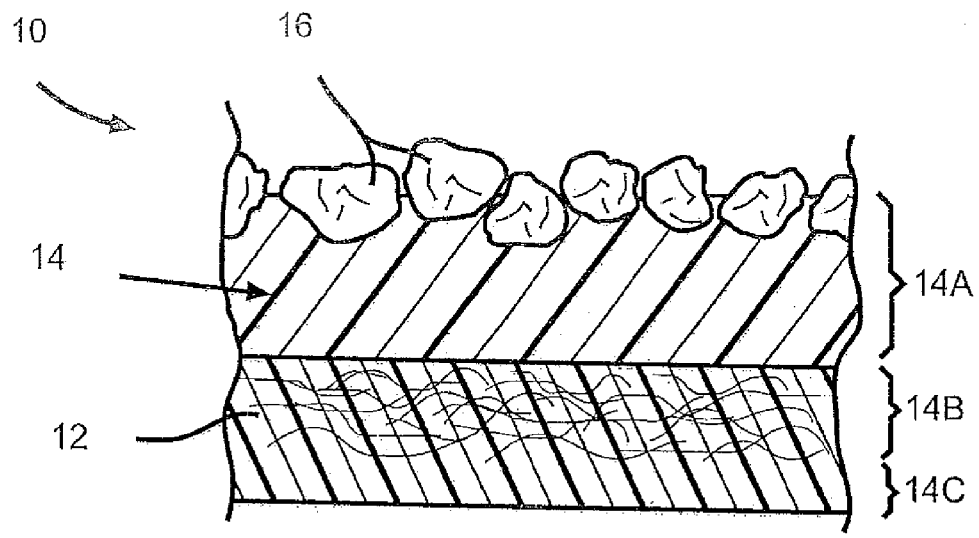
FIG. 1 is a cross-section of a roofing shingle having a coating according to the invention.

In one embodiment of the invention, the coating on the mat is varied in composition to provide a roofing material that is resistant to algae growth and resistant to premature failure by cracking, while at the same time being reduced in cost. As shown in FIG. 1, a roofing material 10 according to the invention includes a mat 12 saturated and coated with an asphalt-based coating 14. The coating includes a top portion 14A covering the top of the mat, a mat portion 14B saturating the mat, and a bottom portion 14C covering the bottom of the mat. As used herein, "top" means the side facing upward or away from the roof when the roofing material is installed on a roof, and "bottom" means the side facing downward or toward the roof. The roofing material usually includes a layer of roofing granules 16 (not drawn to scale) embedded in the top portion of the coating.

The top portion 14A of the coating comprises a mixture of asphalt and rock particles selected from the group consisting of igneous rock particles, metamorphic rock particles, and mixtures thereof. When used as a filler in the top coating, the igneous or metamorphic rock particles provide a roofing material having resistance to algae growth. These types of rock particles do not support algae growth on the finished roofing material. One reason may be that the igneous and metamorphic rock particles are usually harder than other types of filler materials such as ground limestone. The igneous and metamorphic rock particles are also very resistant to moisture absorption, thereby resisting algae growth. Many igneous and metamorphic rock particles are also lower in cost than other filler materials.

Any type of igneous or metamorphic rock particles can be used that are suitable as a filler in an asphalt-based top coating 14A. Some nonlimiting examples of suitable igneous rocks include trap rock, granite, basalt, obsidian, and pumice. Some nonlimiting examples of suitable metamorphic rocks include slate, quartz, amethyst, marble, gneiss, and graphite. Trap rock particles are a preferred type of rock particle for use as a filler in the top coating. The rock particles are usually finely ground particles or powders. Typically, the filler is used in an amount of about 30-75% by total weight of the coating.

Although igneous and metamorphic rock particles provide resistance to algae growth, they may cause premature failure (via cracking) of a roofing material when used as a fillet throughout the entire coating, presumably due to interaction with the mat. Consequently, the mat portion 14B of the coating is made from a mixture of asphalt and a fillet which contains less than about 10% igneous and/or metamorphic rock particles. Preferably, the filler is substantially flee of igneous and/or metamorphic rock particles. By using the igneous or metamorphic rock particles as a filler only in the top coating and not in the mat coating, the algae resistance characteristics can be obtained without the increased risk of premature failure.

Any type of suitable filler besides igneous or metamorphic rock particles can be used in the mat portion 14B of the coating. Preferably, the same filler is also used in the bottom portion 14C of the coating. Some nonlimiting examples of suitable fillers include particles of sedimentary rocks or minerals such as limestone, dolomite, silica, talc, shale, clay, or mica. Other suitable fillers include fly ash, carbon black, and inorganic fibers. Typically, the filler comprises sedimentary rock particles. In a preferred embodiment of the invention, trap rock particles are used as a filler in the top coating 14A and limestone particles are used as a fillet in the mat coating 14B and the bottom coating 14C.

In another embodiment of the invention, the coating of the roofing material is varied in composition to improve handling and avoid cracking while limiting the cost of the roofing material. Shingle handling (pliability, especially in cold conditions) has become more important with the increased popularity of premium and laminated shingles. The formation of cracks in the top surface of a shingle is the primary symptom of poor cold handling.

Referring again to FIG. 1, the handling of the roofing material 10 is improved by using an asphalt-based coating having a high pliability or flexibility in the top portion 14A of the coating 14. The high pliability of the coating is defined by a pliability test described in CSA Standard A123.5-98, Section 8.5. In this Standard, five machine direction and five cross-machine direction roofing material specimens are tested by bending them over the radius of a mandrel. The test conditions are the same as described in ASTM Method D228, except that the test temperature is 32° F.+/−5° F. (0° C.+/−3° C.) and the mandrel radius is 2 inches +/−1/16 inch (5.1 cm+/− 0.2 cm). A roofing material having high pliability meets or exceeds the pliability requirements of Table 1 in CSA A123.5-98.

One way to increase the pliability of the coating is to use an asphalt in the coating which was treated by ferric treatment during its processing. The ferric treatment produces a softer asphalt. The pliability of the asphalt may also be improved by modifying the asphalt with a rubber material, such as an SBS rubber.

However, the highly pliable coating is usually more costly than a typical asphalt-based coating. Since the formation of cracks in the top surface is the prime symptom of poor cold handling, the highly pliable coating can be used only in the top portion 14A of the coating, not the bottom portion 14C. In some embodiments, the mat portion 14B of the coating also does not have the high pliability.

It should be noted that fox purposes of testing the different asphalt-based coatings for pliability according to CSA Standard A123.5-98, separate test roofing materials are produced with the different coatings applied to coat the entire roofing material (top portion, mat portion and bottom portion). The same procedure is used for other tests described below.

In another embodiment of the invention, the coating of the roofing material is varied in composition to provide excellent weathering performance while reducing the cost of the roofing material. Over time, the effects of weather on the coating of a roofing material may cause deterioration of the coating, such as brittleness and cracking. Therefore, it is desirable to provide a coating having the ability to withstand the effects of weather without deteriorating for a long period of time. Weathering performance of coating asphalt is an important selection criterion, eliminating many lower cost asphalts for use in typical footing materials.

Figure 2:
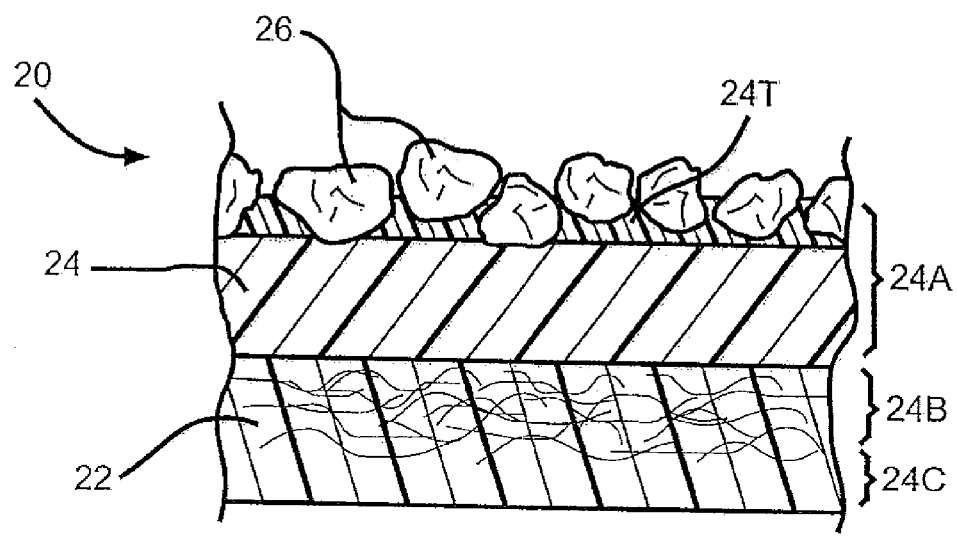
FIG. 2 is a cross-section of another embodiment of a roofing shingle having a coating according to the invention.

FIG. 2 illustrates a rooting material 20 according to the invention which has excellent weathering performance while being reduced in cost. The roofing material includes a mat 22 saturated and coated with an asphalt-based coating 24. The coating includes a top portion 24A covering the top of the mat, a mat portion 24B saturating the mat, and a bottom portion 24C covering the bottom of the mat The top portion 24A of the coating includes a top surface layer 24T. The roofing material usually includes a layer of roofing granules 26 embedded in the top surface layer 24T.

In accordance with the invention, at least the top surface layer 24T of the top portion 24A of the coating passes a weathering performance test as measured by at least 60 cycles-to-failure using ASTM Method D4799, "Standard Test Method for Accelerated Weathering Test Conditions and Procedures for Bituminous Materials (fluorescent UV and Condensation Method)", published March 2000 The top surface layer is preferably at least about 0.023 inch (0.058 cm) thick. In one embodiment, the entire top portion of the coating passes this weathering performance test. Using Cycle A of the test method, the coating material is exposed to cycles of four hours of UV light at 60° C., alternating with fours hours of condensation at 50° C. The cycles are continued until the coating material fails due to cracking as determined by ASTM Test Method D1670.

However, the roofing material can be produced so that the bottom portion 24C of the coating does not pass the weathering performance test. This allows the use of lower cost asphalts in the bottom portion. In some embodiments, the top portion 24A of the coating except for the top surface layer 24T is also made with a lower cost asphalt, and/or the mat portion 24B of the coating is also made with the lower cost asphalt.

An example of an asphalt which can be used to make a coating portion passing the weathering test is an asphalt containing primarily Alaska North Slope crude. An example of a lower cost asphalt which can be used to make coating portions that do not pass the weathering test is an asphalt containing predominantly California crude.

In another embodiment of the invention, the coating of the roofing material is varied in composition to increase the reflectivity or solar reflectance of the coating. A highly reflective coating would allow up to a 5% increase in shingle reflectivity in a standard shingle. A more reflective shingle can reduce the amount of solar radiation penetrating the roof of a building, thereby lowering the air conditioning costs of the building. Alternatively, a highly reflective coating would allow the use of less opaque (or fewer) granules. Referring again to FIG. 2, the reflectivity is increased by using an asphalt-based coating having a high reflectivity in at least the top surface layer 24T of the top portion 24A of the coating. The high reflectivity is defined by a solar reflectance of at least 0.7 when tested by ASTM Method E903. An asphalt-based coating having a high reflectivity can be produced by incorporating metal flakes into the coating. These flakes may be further coated with metal oxides such as titanium dioxide or zinc sulfide to further increase the reflectivity.

However, the bottom portion 24C of the coating does not have the high reflectivity, because reflectivity is not needed in this portion of the coating Specifically, the coating in this portion of the roofing material has a solar reflectance less than 0.7. This allows the use of lower cost asphalts in the bottom portion. In some embodiments, the top portion 24A of the coating except for the top surface layer 24T is also made with a lower cost asphalt, and/or the mat portion 24B of the coating is made with the lower cost asphalt.

In another embodiment of the invention, the roofing material is a laminated roofing material such as a laminated shingle. Laminated roofing shingles are usually stacked face to face in a bundle. The weight on the shingles in the bundle may cause the top coatings of adjacent shingles to stick together, particularly in warm temperatures. In accordance with the invention, the coating of the roofing material is varied in composition to reduce face to face sticking of shingles or other roofing materials when they are stacked together.

Figure 3:
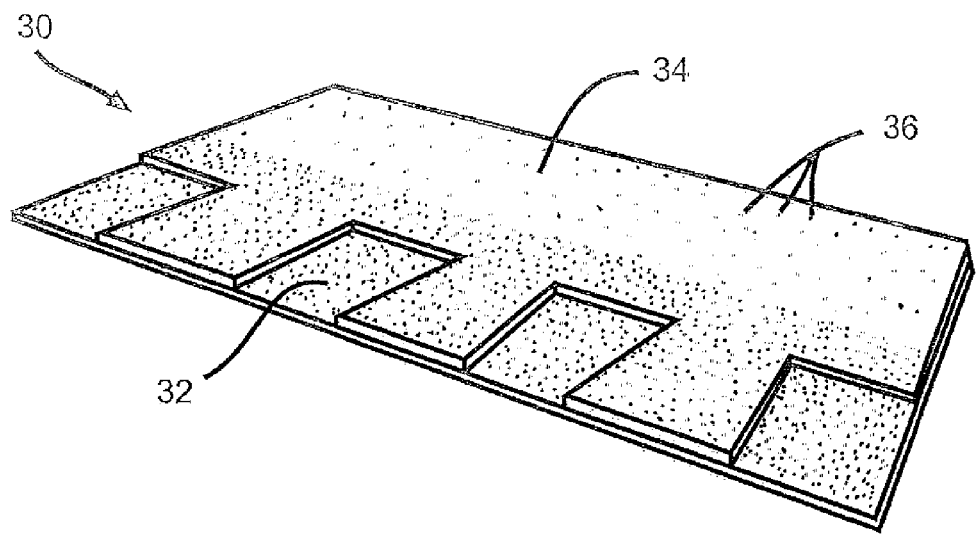
FIG. 3 is a perspective view of a laminated roofing shingle having a coating according to the invention.

FIG. 3 illustrates a laminated roofing shingle 30 according to the invention. The laminated shingle includes an underlay 32 and an overlay 34 covering a portion of the top of the underlay, while leaving a portion of the underlay uncovered. Like the roofing material shown in FIG. 2, the underlay comprises a mat 22 saturated and coated with an asphalt-based coating 24. The coating includes a top portion 24A covering the top of the mat, a mat portion 24B saturating the mat, and a bottom portion 24C covering the bottom of the mat. The top portion 24A of the coating includes a top surface layer 24T.

The overlay comprises a layer of an asphalt-based coating. Typically, like the roofing material shown in FIG. 2, the overlay further comprises a mat 22 which is saturated and coated with the layer of asphalt-based coating 24. The coating includes a top portion 24A covering the top of the mat, a mat portion 24B saturating the mat, and a bottom portion 24C covering the bottom of the mat. The coating includes a top surface layer 24T. The laminated roofing material usually includes a top surface layer of roofing granules 36.

In accordance with the invention, at least the top surface layer of the overlay, and at least the top surface layer of the underlay on the uncovered portion of the underlay, are made with an asphalt having certain viscoelastic properties. The viscoelastic properties prevent the coating of one shingle from sticking to the coating of an adjacent shingle when the shingles are stacked face to face in bundles, the bundles are stacked onto pallets, and the pallets are stored at temperatures exceeding 90° F. (32° C.). In a specific embodiment, the shingles are Owens Corning Architectural Series laminated shingles, the shingles are stacked face to face in a bundle of 22 shingles, four bundles ale stacked on top of one another on a pallet, and the pallet is stored at 95° F. (35° C.) for 24 hours. None of the coatings of the shingles stick together so as to cause damage to the shingles when they are unpacked from the bundles. Preferably, the top surface layer of the overlay, and the top surface layer of the underlay on the uncovered portion of the underlay, are at least about 0.023 inch (0.58 cm) thick. In some embodiments, the entire top portion of the coating on the overlay and on the uncovered portion of the underlay are made with an asphalt having the viscoelastic properties to prevent sticking.

However, asphalts having these viscoelastic properties can be high in cost, and their use reduces the number of raw material choices. Consequently, instead of using such an asphalt for the entire roofing material, a lower cost asphalt not having the viscoelastic properties being used for coating the bottom portion 24C of the coating. In some embodiments, the mat portion 24B is also made with the lower cost asphalt.

An example of an asphalt having the viscoelastic properties is Trumbull asphalt manufactured by Owens Corning. An example of a lower cost asphalt not having the viscoelastic properties is an asphalt containing predominantly Venezuelan crude.

In another embodiment of the invention, the coating of the roofing material is varied in composition to markedly improve resistance of the roofing material to hail damage. The impact of heavy hail on a roofing material can cause granule loss, immediate or delayed, from the top surface of the roofing material. In some instances, the impact of hail can also cause a small tear or puncture in the roofing material.

Referring again to FIG. 2, resistance to granule loss caused by hail impact is improved by using an asphalt-based coating having an increased adhesion in at least the top surface layer 24T of the top portion 24A of the coating. In some embodiments the entire top portion 24A has increased adhesion. The increased adhesion is defined by a granule loss of less than 0.8 grams when the roofing material is soaked in water for seven days and then tested by ASTM Method D4977. The increased adhesion can be obtained, for example, by modifying the asphalt with certain polymers such as synthetic rubbers, e.g., SBS rubber.

However, since a coating having increased adhesion is usually more costly than a typical coating, the cost is limited by using a coating not having the increased adhesion in the bottom portion 24C of the coating. In some embodiments, the mat portion 24B also does not have the increased adhesion.

Figure 4:
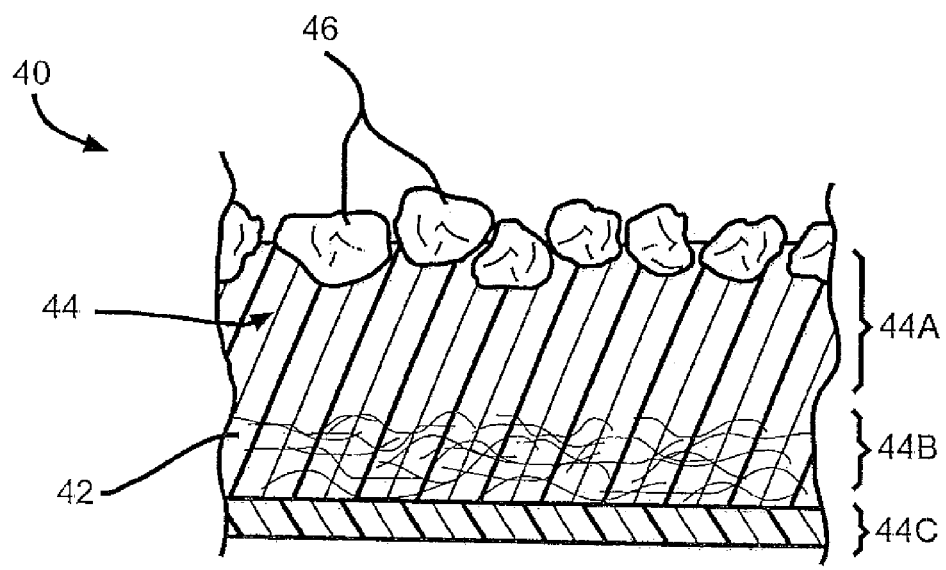
FIG. 4 is a cross-section of another embodiment of a roofing shingle having a coating according to the invention.

As shown in FIG. 4, resistance to tear/puncture caused by hail impact is improved by using an asphalt-based coating having increased toughness in the bottom portion 44C of the coating 44. It has been found that increasing the toughness of the bottom portion of the coating by itself is sufficient to reduce the occurrence of tears and punctures caused by hail impact. Consequently, the top portion 44A of the coating does not require the increased toughness. Specifically, the bottom portion of the coating has an increased toughness compared to the top portion, such that the roofing material has an increased impact resistance of at least one UL 2218 class compared to the same roofing material having a bottom portion of the coating with the same toughness as the top portion. In some embodiments, the mat portion 44B also does not have the increased toughness.

The improved impact resistance of the roofing materials is demonstrated by the use of a standard method, UL 2218, "Standard for Impact Resistance of Prepared Roof Covering Materials", Underwriters Laboratories, May 31, 1996. In this method, the roofing material is secured to a test deck, and a steel ball is dropped vertically through a tube onto the upper surface of the roofing material. The roofing material can be tested at four different impact force levels: Class 1 (the lowest impact force) through Class 4 (the highest impact force). The force of impact in the different classes is varied by changing the diameter and weight of the steel ball, and the distance the ball is dropped. For example, the Class 1 test uses a steel ball having a diameter of 1.25 inches (32 mm) weighing 0.28 pounds (127 g) that is dropped a distance of 12 feet (3.7 m), while the Class 4 test uses a steel ball having a diameter of 2 inches (51 mm) weighing 1.15 pounds (521 g) that is dropped a distance of 20 feet (6.1 meters). After the impact, the roofing material is inverted and bent over a mandrel in both the machine and cross directions, and the lower surface of the roofing material is examined visually for any evidence of an opening or tear. A 5× magnification device may be used to facilitate the examination of the roofing material. If no evidence of an opening is found, the roofing material passes the impact resistance test at the UL 2218 class tested. Preferably, the roofing material has an increased impact resistance of at least two UL 2218 classes. More preferably, the roofing material meets a UL 2218 Class 4 impact resistance standard.

The increased toughness of the bottom portion of the coating can be obtained, for example, by modifying the asphalt with certain polymers, such as synthetic rubber or ethylene vinyl acetate.

The bottom portion of the coating with increased toughness, and the top portion of the coating with increased adhesion, can be used together or separately in a roofing material to provide their respective benefits.

In one embodiment of the invention, at least the top surface of the top portion of the coating has increased adhesion to prevent granule loss, as described above. For example, the top portion of the coating may be made with a polymer-modified asphalt to increase its adhesion. Optionally, a layer of an adhesive material can be applied to the top surface of the coating to further improve the granule adhesion. The bottom portion of the coating does not have the increased adhesion. A web is fused to the bottom portion of the coating. The web improves the impact resistance of the roofing material as described above. The roofing material has an increased impact resistance of at least one UL 2218 class compared to the same roofing material without the web. Suitable webs for improving the impact resistance of a roofing material are described in U.S. Pat. No. 6,228,785, issued May 8, 2001, which is incorporated by reference in its entirety.

Figure 5:
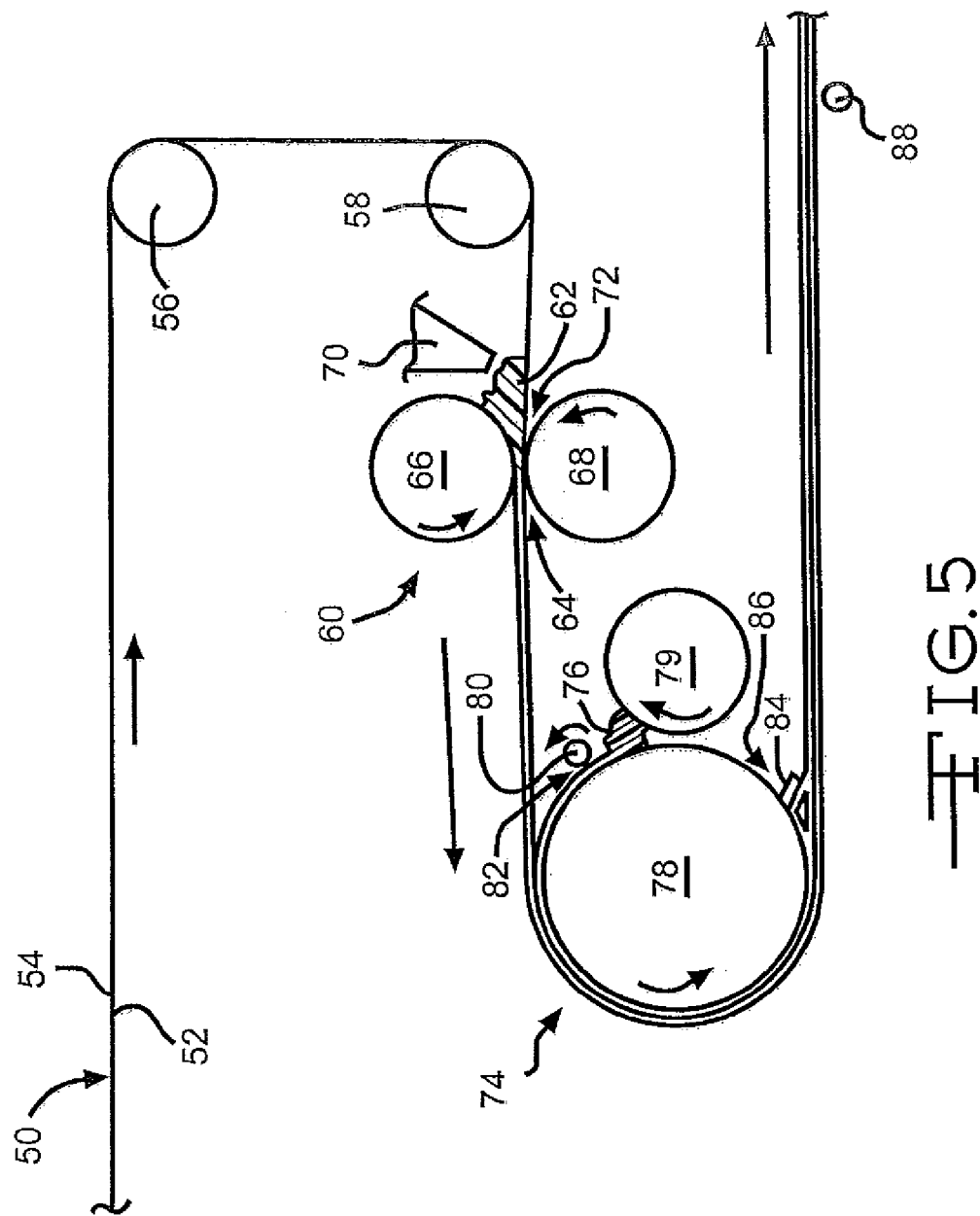
FIG. 5 is a schematic view of process for coating a roofing material according to the invention.
Figure 6:
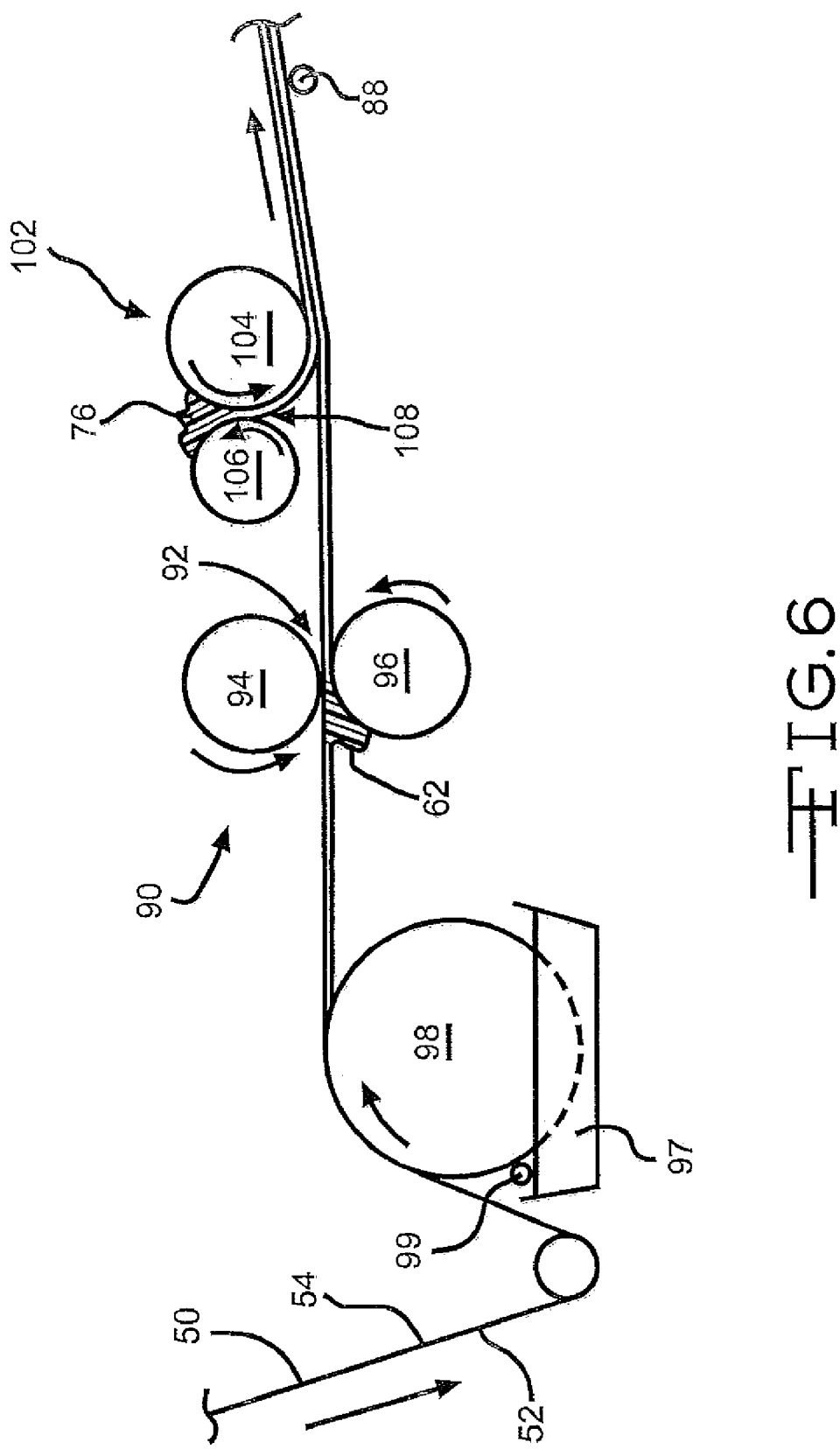
FIG. 6 is a schematic view of another embodiment of a process for coating a roofing material according to the invention.
Figure 7:
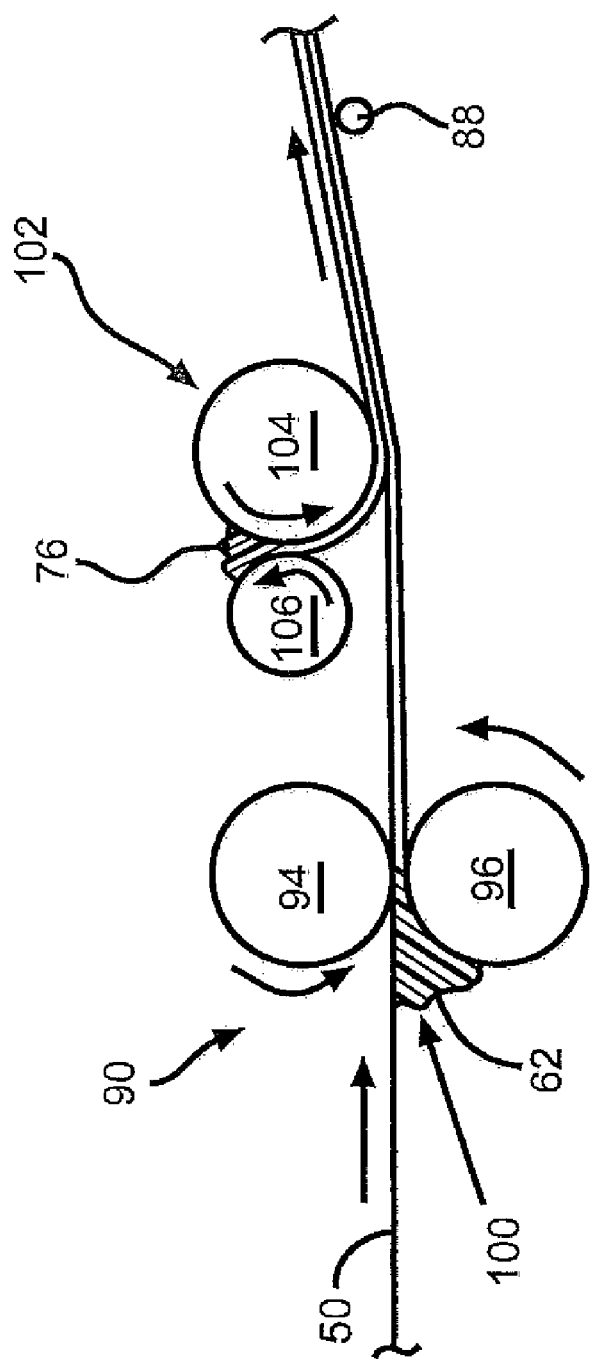
FIG. 7 is a schematic view of another embodiment of a process for coating a roofing material according to the invention.

Some preferred embodiments of the asphalt-based roofing materials of the invention are produced by a coating process that applies the top coating independently of the mat coating and the bottom coating, or that applies the bottom coating independently of the mat coating and the top coating (e.g., in the embodiment relating to a tougher bottom coating). FIGS. 5-7 illustrate several different embodiments of preferred continuous processes according to the invention for coating roofing materials.

As shown in FIG. 5, a continuous mat 50 is moved continuously along a path, indicated by the arrows. The mat has a first surface 52 and a second surface 54. In the illustrated embodiment, the first surface is a bottom surface 52 of the mat, and the second surface is a top surface 54 of the mat. As used herein, "top surface" and "bottom surface" refer to the orientation of the mat surfaces in the roofing material which is prepared using the mat.

In the embodiment shown in FIG. 5, the mat 50 is inverted before the first coating operation so that the bottom surface 52 is oriented upward when applying the first coating to the bottom surface. In the illustrated embodiment, the mat is inverted by passing the mat around a first roll 56 and a second roll 58.

In a first coating operation, indicated generally at 60, a first asphalt-based coating 62 is continuously applied to the bottom surface 52 of the mat 50 in a manner so that the first coating saturates the mat and forms a layer on the bottom surface. In the embodiment shown, the first coating operation comprises moving the mat through a gap 64 between an upper squeeze roll 66 and a lower squeeze roll 68. The first coating 62 is supplied to a location before the gap and above the mat so that the first coating moves through the gap with the mat. In the illustrated embodiment, the first coating is supplied by a trough 70 to the nip 72 between the upper and lower squeeze rolls. However, it could also be supplied at a location before the nip. The first coating is fed to the applicator via a pipeline (not shown) from a first coating supply source (not shown).

The squeeze rolls force the first coating to enter and saturate the mat and to form a layer on the bottom surface 52 of the mat (which is now oriented upward). The size of the gap between the squeeze rolls controls the thickness of the layer of first coating on the bottom surface of the mat. Preferably, the upper squeeze roll 66 rotates in a direction so that the surface of the upper squeeze roll adjacent the mat moves in a direction opposite the direction of the mat. The opposite direction of movement of the upper squeeze roll promotes a smooth surface of the first coating. Preferably, the lower squeeze roll 68 rotates in a direction so that the surface of the lower squeeze roll adjacent the mat moves in the same direction as the mat.

In a second coating operation, indicated generally at 74, a second asphalt-based coating 76 is continuously applied to the top surface 54 of the mat 50 (now oriented downward) in a manner so that the second coating forms a layer on the top surface. In some preferred embodiments of the invention, the second coating has different properties from the first coating. However, in other embodiments of the invention, the second coating can be the same type of coating as the first coating, having the same properties. In the embodiment shown, the second coating is applied to the mat with a large applicator roll 78. Roll 79 positioned beside the applicator roll forms the other surface of the reservoir for the coating 76. The second coating 76 is supplied to the reservoir by an applicator (not shown) and flows onto the applicator roll 78 for application to the mat. In the illustrated embodiment, the second coating operation also employs a metering bar or roll 80 positioned adjacent the applicator roll with a gap 82 therebetween The metering roll wipes off all but the desired film thickness, set by the size of the gap between the applicator roll and the metering roll.

The applicator roll usually rotates in a direction so that the surface of the applicator roll adjacent the mat moves in the same direction as the mat, and the surface of the applicator roll moves at a speed preferably relatively close to the sheet speed, preferably within a range of from about 90% to about 110% of the speed of the mat. One skilled in the art appreciates that the speed range may be adjusted to achieve proper coating of the mat. The metering roll rotates in a direction opposite the direction of the applicator roll so that the second coating is held in the reservoir. Preferably, the mat wraps on the applicator roll to promote wetting and transfer of the second coating to the mat, more preferably over at least about 120 degrees of the roll (it wraps 180 degrees in the embodiment shown).

Preferably, the second coating operation employs a device 84 to scrape the second coating from the surface of the applicator roll and smoothly apply the coating to the mat. In the illustrated embodiment, the device is generally bar-shaped, and it is positioned in the nip (indicated generally at 86) between the applicator roll and the mat. Such a device can help to ensure substantially 100% transfer of the coating from the roll to the mat.

Preferably, the first and second coating operations can be independently controlled in a dial-in mode in which control parameters are set once and do not require adjustment throughout the continuous process. Such a process is much more efficient than a process requiring feedback and adjustment of the controls.

After the first and second coatings have been applied to the mat, the mat moves over a rounded exit support 88 for further process steps (not shown) in the manufacture of the roofing material, such as granule application, cooling and cutting.

In the embodiment of the process shown in FIG. 6, the mat 50 is not inverted before the first coating operation. Consequently, the bottom surface 52 of the mat is oriented downward when applying the first coating to the bottom surface. Like in the first embodiment, the process includes a first coating operation, indicated generally at 90, in which the first coating is continuously applied to the bottom surface of the mat in a manner so that the first coating saturates the mat and forms a layer on the bottom surface. In the embodiment shown, the first coating operation involves moving the mat through a gap 92 between an upper squeeze roll 94 and a lower squeeze roll 96. The first coating 62 is supplied to a location before the gap and below the mat so that the first coating moves through the gap with the mat. The squeeze rolls force the first coating to enter and saturate the mat and to form a layer on the bottom surface of the mat. The size of the gap between the upper squeeze roll and the lower squeeze roll controls the thickness of the layer of first coating.

Preferably, the lower squeeze roll 96 rotates in a direction so that the surface of the lower squeeze roll adjacent the mat moves in a direction opposite the direction of movement of the mat. The opposite direction of movement of the lower squeeze roll promotes a smooth surface of the first coating. Preferably, the upper squeeze roll 94 rotates in a direction so that the surface of the upper squeeze roll adjacent the mat moves in the same direction as the mat.

The first coating can be supplied to the location before the gap and below the mat in any suitable manner. Preferably, the first coating is supplied by applying a layer of the first coating to the bottom surface of the mat before moving the mat through the squeeze rolls. In the embodiment shown in FIG. 6, the first coating is supplied by applying the layer of first coating to the bottom surface of the mat with an inking roll 98 which draws molten coating from a tub 97. The inking roll slathers on a layer of the first coating for use in the squeeze rolls. A metering bar 99 defines a gap where coating is allowed to pass, thereby controlling the amount of coating that goes onto the mat; the test of the coating falls back into the tub. The illustrated process does not use a nip roll with the inking roll. The height of the inking roll, and the resulting position of the mat, is controlled so that the mat does not wrap on the lower squeeze roll.

In the embodiment shown in FIG. 7, the first coating is supplied by feeding the first coating to the nip 100 between the mat 50 and the lower squeeze roll 96. The first coating can be fed to the nip by any suitable means. Preferably, it is fed to the nip via a trough (not shown) that seals against the lower squeeze roll. The trough may be kept overflowing by filling on one side and flowing over a weir on the other.

Referring to FIGS. 6 and 7, in a second coating operation, indicated generally at 102, a second asphalt-based coating 76 is continuously applied to the top surface 54 of the mat 50 in a manner so that the second coating forms a layer on the top surface. The second coating has different properties from the first coating. In the embodiment shown, the second coating is applied to the mat with an applicator roll 104. In the illustrated embodiment, the second coating operation also employs a metering roll 106 positioned beside the applicator roll with a gap 108 therebetween. The second coating 76 is supplied above the gap and flows through the gap onto the applicator roll for application to the mat. The size of the gap between the applicator roll and the metering roll controls the thickness of the second coating on the mat. Preferably, a device (not shown) to scrape the second coating from the surface of the applicator roll and smoothly apply it to the mat is positioned in the nip between the applicator roll and the mat.

Preferably, the applicator roll rotates in a direction so that the surface of the applicator roll adjacent the mat moves in the same direction as the mat, and the surface of the applicator roll moves at a speed within a range of from about 90% to about 110% of the speed of the mat. The metering roll rotates in a counterclockwise direction so that the moving surface of the metering roll holds the second coating above the gap. Preferably, the mat at least slightly wraps on the applicator roll to promote wetting and transfer of the second coating to the mat. In the illustrated embodiment, the mat moves over a rounded exit support 88 which is positioned to cause a slight wrap of the mat on the applicator roll. Preferably, the second coating operation employs a device (not shown) to scrape the second coating from the surface of the applicator roll and smoothly apply the coating to the mat.

In an alternate embodiment of the second coating operation (not shown), the applicator roll rotates in a direction so that the surface of the applicator roll adjacent the mat moves in a reverse direction relative to the mat movement. The metering roll is positioned on the other side of the applicator roll, and it rotates in a clockwise direction. A metering bar is positioned at a 10 o'clock position relative to the applicator roll, controlling the thickness of the coating. No device is needed to scrape the applicator roll, as the mat wipes all the coating off. Preferably, the speed of the applicator roll is about 30-50% of the speed of the mat, in the reverse direction. One skilled in the art appreciates that the speed may be adjusted to vary the thickness, a slower speed will result in a thicker coating, and a faster speed will result in a thinner coating, and increase the sheet tension.

The principle and mode of operation of this invention have been described in its preferred embodiments. However, it should be noted that this invention may be practiced other wise than as specifically illustrated and described without departing from its scope.

What is claimed is:

1. A continuous process of applying first and second asphalt-based coatings to a mat for manufacturing a roofing material, the process comprising:
   continuously moving a continuous mat along a path, the mat having a first surface and a second surface;
   in a first coating operation, continuously applying a first asphalt-based coating to the first surface of the mat in a manner so that the first coating saturates the mat and forms a layer on the first surface and does not form a layer on the second surface; and then
   in a second coating operation, continuously applying a second asphalt-based coating to the second surface of the mat in a manner so that the second coating forms a layer on the second surface and does not form a layer on the first surface;
   the second coating having properties which differ from the first coating in at least one of the following aspects:
   (a) one of the first and second coatings meets or exceeds a pliability standard described in CSA Standard A123.5-98, and the other coating does not meet the pliability standard;
   (b) one of the first and second coatings passes a weathering performance test as measured b at least 60 cycles-to-failure using ASTM Method D4799, and the other coating does not pass the weathering performance test;
   (c) one of the first and second coatings has a solar reflectance of at least 0.7 when tested by ASTM Method E903, and the other coating has a solar reflectance of less than 0.7;
   (d) one of the first and second coatings has viscoelastic properties effective to prevent the coating from sticking to a coating of an adjacent roofing material when the roofing materials are stacked face to face in a bundle and stored at a temperature exceeding 90° F. (32° C.), and the other coating does not have the viscoelastic properties;
   (e) one of the first and second coating has an increased adhesion defined by a granule loss of less than 0.8 grams when the roofing material is soaked in water for seven days and then tested by ASTM Method D4977, and the other coating does not have the increased adhesion;
   (f) one of the first and second coatings includes a filler of igneous or metamorphic rock particles in an amount from about 30% to about 75% by weight of the coating, and the other coating includes from 0% to about 10% of the filler of igneous or metamorphic rock particles; and
   (g) one of the first and second coatings has an increased toughness compared to the other coating, such that the roofing material has an increased impact resistance of at least one UL 2218 class compared to the same roofing material made without one of the coatings having the increased toughness.

2. A process according to claim 1 wherein the first and second coating operations can be independently controlled in a dial-in mode in which control parameters are set once and do not require adjustment throughout the continuous process.

3. A process according to claim 1 wherein the first surface of the mat is a bottom surface, and the first coating operation comprises applying the first coating to the bottom surface of the mat in a manner so that the first coating saturates the mat and forms a layer on the bottom surface.

4. A process according to claim 3 wherein the mat is inverted before the first coating operation so that the bottom surface is oriented upward when applying the first coating.

5. A process according to claim 4 wherein the first coating operation comprises moving the mat through a gap between an upper squeeze roll and a lower squeeze roll, and supplying the first coating to a location before the gap and above the mat so that the first coating moves through the gap with the mat, the squeeze rolls forcing the first coating to enter and saturate the mat and to form a layer on the bottom surface of the mat.

6. A process according to claim 5 wherein the upper squeeze roll rotates in a direction so that the surface of the upper squeeze roll adjacent the mat moves in a direction opposite the direction of the mat.

7. A process according to claim 6 wherein the lower squeeze roll rotates in a direction so that the surface of the lower squeeze roll adjacent the mat moves in the same direction as the mat.

8. A process according to claim 6 wherein the size of the gap between the upper squeeze roll and the lower squeeze roll controls the thickness of the layer of first coating on the mat.

9. A process according to claim 3 wherein the bottom surface is oriented downward when applying the first coating to the bottom surface.

10. A process according to claim 9 wherein the first coating operation comprises moving the mat through a gap between an upper squeeze roll and a lower squeeze roll, and supplying the first coating to a location before the gap and below the mat so that the first coating moves through the gap with the mat, the squeeze rolls forcing the first coating to enter and saturate the mat and to form a layer on the bottom surface of the mat.

11. A process according to claim 10 wherein the lower squeeze roll rotates in a direction so that the surface of the lower squeeze roll adjacent the mat moves in a direction opposite the direction of the mat.

12. A process according to claim 11 wherein the position of the mat is controlled so that the mat does not wrap on the lower squeeze roll.

13. A process according to claim 11 wherein the upper squeeze roll rotates in a direction so that the surface of the upper squeeze roll adjacent the mat moves in the same direction as the mat.

14. A process according to claim 10 wherein the size of the gap between the upper squeeze roll and the lower squeeze roll controls the thickness of the layer of first coating on the mat.

15. A process according to claim 10 wherein the first coating is supplied by applying a layer of the first coating to the bottom surface of the mat before moving the mat though the squeeze rolls.

16. A process according to claim 15 wherein the first coating is supplied by applying the layer of first coating to the bottom surface of the mat with an inking roll.

17. A process according to claim 10 wherein the first coating is supplied by feeding the first coating to a nip between the mat and the lower squeeze roll.

18. A process according to claim 17 wherein the first coating is fed to the nip via a trough which seals against the lower squeeze roll.

19. A process according to claim 1 wherein the second coating is applied with an applicator roll, and including the step of scraping the second coating from the surface of the applicator roll and smoothly apply the scraped coating to the mat.

20. A process according to claim 1 wherein the second coating is applied with an applicator roll, and wherein the second coating operation further employs a metering roll positioned adjacent the applicator roll with a gap therebetween, the size of the gap controlling the thickness of the second coating on the mat.

21. A process according to claim 20 wherein the applicator roll rotates in a direction so that the surface of the applicator roll adjacent the mat moves in the same direction as the mat.

22. A process according to claim 21 wherein the surface of the applicator roll adjacent the mat moves at a speed within a range of from about 70% to about 130% of the speed of the mat.

23. A process according to claim 21 wherein the surface of the applicator roll adjacent the mat moves at a speed within a range of from about 90% to about 110% of the speed of the mat.

24. A process according to claim 1 wherein the second coating is applied with an applicator roll, and wherein the mat wraps on the applicator roll to promote wetting and transfer of the second coating to the mat.

25. A process according to claim 24 wherein the mat wraps on the applicator roll over at least about 120 degrees of the applicator roll.

26. A process according to claim 20 wherein the applicator roll rotates in a direction so that the surface of the applicator roll adjacent the mat moves in the a direction which is reverse the direction of the mat, and wherein the surface of the applicator roll adjacent the mat moves at a speed within a range of from about 10% to about 100% of the speed of the mat.

27. A process according to claim 20 wherein the applicator roll rotates in a direction so that the surface of the applicator roll adjacent the mat moves in the a direction which is reverse the direction of the mat, and wherein the surface of the applicator roll adjacent the mat moves at a speed within a range of from about 20% to about 60% of the speed of the mat.

28. A process according to claim 20 wherein the applicator roll rotates in a direction so that the surface of the applicator roll adjacent the mat moves in the a direction which is reverse the direction of the mat, and wherein the surface of the applicator roll adjacent the mat moves at a speed within a range of from about 30% to about 50% of the speed of the mat.

29. A process according to claim 3 wherein the second coating meets or exceeds the pliability standard and the first coating does not.

30. A process according to claim 3 wherein the second coating passes the weathering performance test and the first coating does not.

31. A process according to claim 3 wherein the second coating has the solar reflectance of at least 0.7 and the first coating has a solar reflectance of less than 0.7.

32. A process according to claim 3 wherein the second coating has the viscoelastic properties and the first coating does not.

33. A process according to claim 3 wherein the second coating has the increased adhesion and the first coating does not.

34. A process according to claim 3 wherein the second coating includes the filler of igneous or metamorphic rock particles in an amount from about 30% to about 75% by weight of the coating, and the first coating includes from 0% to about 10% of the filler of igneous or metamorphic rock particles.

35. A process according to claim 1 wherein the first surface of the mat is a top surface, and the first coating operation comprises applying the first coating to the top surface of the mat in a manner so that the first coating saturates the mat and forms a layer on the top surface, and wherein the second coating has the increased toughness compared to the first coating.

36. A continuous process of applying first and second asphalt-based coatings to a mat for manufacturing a roofing material, the process comprising:
    continuously moving a continuous mat along a path, the mat having a bottom surface and a top surface;
    in a first coating operation, continuously applying a first asphalt-based coating to the bottom surface of the mat in a manner so that the first coating saturates the mat and forms a layer on the bottom surface and does not form a layer on the top surface; and then
    in a second coating operation, continuously applying a second asphalt-based coating to the top surface of the mat in a manner so that the second coating forms a layer on the top surface and does not form a layer on the bottom surface;
    wherein the first and second coating operations can be independently controlled in a dial-in mode in which control parameters are set once and do not require adjustment throughout the continuous process;
    the second coating having properties which differ from the first coating in at least one of the following aspects:
    (a) one of the first and second coatings meets or exceeds a pliability standard described in CSA Standard A123.5-98, and the other coating does not meet the pliability standard;
    (b) one of the first and second coatings passes a weathering performance test as measured by at least 60 cycles-to-failure using ASTM Method D4799, and the other coating does not pass the weathering performance test;
    (c) one of the first and second coatings has a solar reflectance of at least 0.7 when tested by ASTM Method E903, and the other coating has a solar reflectance of less than 0.7;
    (d) one of the first and second coatings has viscoelastic properties effective to prevent the coating from sticking to a coating of an adjacent roofing material when the roofing materials are stacked face to face in a bundle and stored at a temperature exceeding 90° F. (32° C.), and the other coating does not have the viscoelastic properties;
    (e) one of the first and second coatings has an increased adhesion defined by a granule loss of less than 0.8 grams when the roofing material is soaked in water for seven days and then tested by ASTM Method D4977, and the other coating does not have the increased adhesion;
    (f) one of the first and second coatings includes a filler of igneous or metamorphic rock particles in an amount from about 30% to about 75% by weight of the coating, and the other coating includes from 0% to about 10% of the filler of igneous or metamorphic rock particles; and
    (g) one of the first and second coatings has an increased toughness compared to the other coating, such that the roofing material has an increased impact resistance of at least one UL 2218 class compared to the same roofing material made without one of the coatings having the increased toughness.

37. A continuous process of applying first and second asphalt-based coatings to a mat for manufacturing a roofing material, the process comprising:
    continuously moving a continuous mat along a path, the mat having a bottom surface and a top surface;

inverting the mat before a first coating operation so that the bottom surface is oriented upward when applying a first asphalt-based coating to the bottom surface;

in the first coating operation, continuously applying the first coating to the bottom surface of the mat in a manner so that the first coating saturates the mat and forms a layer on the bottom surface and does not form a layer on the top surface, wherein the first coating operation comprises moving the mat through a gap between an upper squeeze roll and a lower squeeze roll, and supplying the first coating to a location before the gap and above the mat so that the first coating moves through the gap with the mat, the squeeze rolls forcing the first coating to enter and saturate the mat and to form the layer on the bottom surface; and then in a second coating operation, continuously applying a second asphalt-based coating to the top surface of the mat in a manner so that the second coating forms a layer on the top surface and does not form a layer on the bottom surface, wherein the second coating is applied with an applicator roll, and including the step of scraping the second coating from the surface of the applicator roll and smoothly applying the scraped coating to the mat;

the second coating having properties which differ from the first coating in at least one of the following aspects:

(a) one of the first and second coatings meets or exceeds a pliability standard described in CSA Standard A123.5-98, and the other coating does not meet the pliability standard;

(b) one of the first and second coatings passes a weathering performance test as measured by at least 60 cycles-to-failure using ASTM Method D4799, and the other coating does not pass the weathering performance test;

(c) one of the first and second coatings has a solar reflectance of at least 0.7 when tested by ASTM Method E903, and the other coating has a solar reflectance of less than 0.7;

(d) one of the first and second coatings has viscoelastic properties effective to prevent the coating from sticking to a coating of an adjacent roofing material when the roofing materials are stacked face to face in a bundle and stored at a temperature exceeding 90° F. (32° C.), and the other coating does not have the viscoelastic properties;

(e) one of the first and second coatings has an increased adhesion defined by a granule loss of less than 0.8 grams when the roofing material is soaked in water for seven days and then tested by ASTM Method D4977, and the other coating does not have the increased adhesion;

(f) one of the first and second coatings includes a filler of igneous or metamorphic rock particles in an amount from about 30% to about 75% by weight of the coating, and the other coating includes from 0% to about 10% of the filler of igneous or metamorphic rock particles; and (g) one of the first and second coatings has an increased toughness compared to the other coating, such that the roofing material has an increased impact resistance of at least one UL 2218 class compared to the same roofing material made without one of the coatings having the increased toughness.

38. A continuous process of applying first and second asphalt-based coatings to a mat for manufacturing a roofing material, the process comprising:

continuously moving a continuous mat along a path, the mat having a first surface and a second surface;

in a first coating operation, continuously applying a first asphalt-based coating to the first surface of the mat in a manner so that the first coating saturates the mat and forms a layer on the first surface and does not form a layer on the second surface; and then in a second coating operation, continuously applying a second asphalt-based coating to the second surface of the mat with an applicator roll in a manner so that the second coating forms a layer on the second surface and does not form a layer on the first surface, and including the step of scraping the second coating from the surface of the applicator roll and smoothly applying the scraped coating to the mat.

* * * * *